United States Patent [19]

Ninomiya

[11] 4,069,499
[45] Jan. 17, 1978

[54] WRITE CLOCK PULSE SIGNAL GENERATOR FOR DIGITAL TIME BASE CORRECTOR

[75] Inventor: Takeshi Ninomiya, Chiba, Japan

[73] Assignee: Sony Corporation, Tokyo, Japan

[21] Appl. No.: 694,827

[22] Filed: June 10, 1976

[30] Foreign Application Priority Data

June 12, 1975 Japan .................................. 50-71209

[51] Int. Cl.² ............................................. H04N 5/78
[52] U.S. Cl. .......................................... 358/8; 360/36
[58] Field of Search ................... 358/4, 8; 360/28, 27, 360/33, 36, 37

[56] References Cited

U.S. PATENT DOCUMENTS

| 3,749,835 | 7/1973 | Arimura et al. | 358/8 |
| 3,820,154 | 6/1974 | Faroudja et al. | 358/8 |
| 3,860,952 | 1/1975 | Tallent | 358/8 |

*Primary Examiner*—Benedict V. Safourek

*Attorney, Agent, or Firm*—Lewis H. Eslinger; Alvin Sinderbrand

[57] ABSTRACT

In a time base corrector which converts incoming video signals to digital form and writes the digitized signals in a memory at a clocking rate varying in accordance with time base errors in the incoming signals, whereupon the signals temporarily stored in the memory are read out or fetched therefrom at a standard clocking rate and reconverted to analog form for eliminating the time base errors; the clocking rate for storing the digitized signals is determined by a write clock pulse signal generator having an automatic frequency control circuit in which the output frequency of a variable frequency oscillator is varied in dependence on the horizontal synchronizing signals in the incoming video signals, and an automatic phase control circuit in which the output of the variable frequency oscillator is phase shifted in dependence on the burst signals separated from the incoming video signals.

11 Claims, 7 Drawing Figures

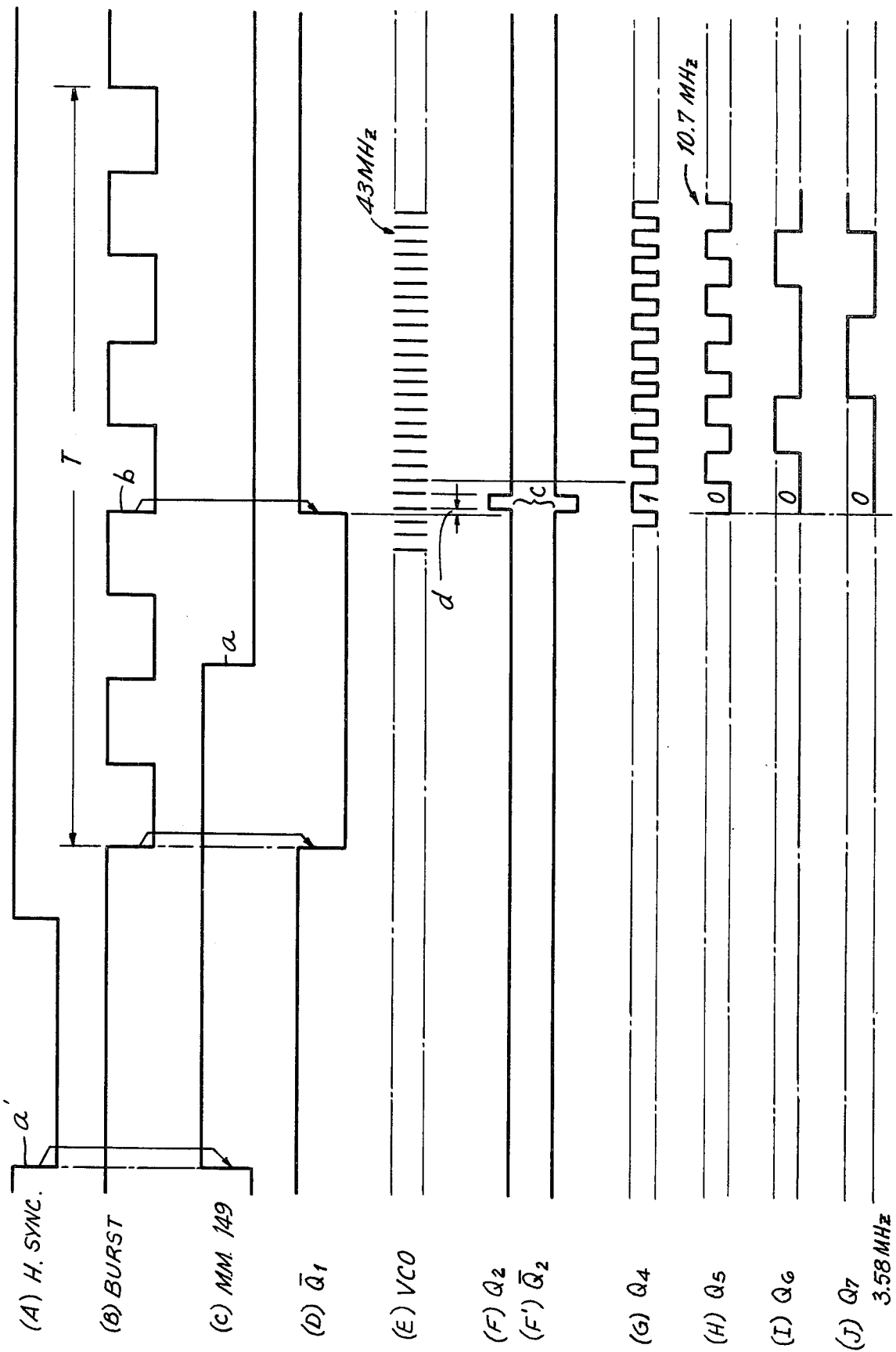

WRITE CLOCK PULSE SIGNAL GENERATOR FOR DIGITAL TIME BASE CORRECTOR

BACKGROUND OF THE INVENTION

1. Field of the Invention

This invention relates generally to the processing of periodic information signals, such as, video signals, and more particularly is directed to improvements in the write clock pulse signal generator for apparatus by which time base errors introduced during recording and/or reproducing of such periodic information signals may be removed.

2. Description of the Prior Art

Video signals are frequently recorded on magnetic tape and subsequently reproduced for later broadcasting or viewing purposes. During the reproduction of recorded video signals, time base or frequency errors are usually introduced by reason of expansion or contraction of the record medium during or after recording, variation in the speed of the tape relative to the magnetic head or heads during recording or reproduction, variation between the tape recording speed and the tape reproducing speed, and the like. The presence of such time base errors in the reproduced video signals cause a frequency shift of the latter which can result in many observable undesirable effects, particularly when the reproduced video signals are to be transmitted or broadcast and may be mixed with live broadcast material that do not have such time base errors. The observable undesirable effects resulting from relatively small time base errors are a smeared or jittery picture with erroneous intensity variations and, in the case of color video signals, improper color display. When the time base errors are large, the reproduced picture will fail to lock horizontally or vertically.

In an existing time base corrector for substantially removing time base errors from video signals, for example, as disclosed in U.S. Pat. No. 3,860,952, issued Jan. 14, 1975, the incoming video signals are converted from analog to digital form and temporarily stored in a memory. Time base errors are removed from the video signals by writing the digitized signals in the memory at a clocking rate which varies in a manner generally proportional to the time base errors, and by fetching or reading out these stored signals at a standard clocking rate. After such reading out of the digitized video signals, the latter are reconverted to analog form and applied to an output signal. In the foregoing time base corrector, the rate at which the digitized signals are written in the memory is determined by a write clock pulse signal from a variable frequency or voltage controlled oscillator (VCO) which derives its control voltage by the summation of the control voltages from two comparators in which the output of the VCO, after being suitably divided, is compared with the horizontal synchronizing signals and the burst signals, respectively, separated from the incoming video signals so as to provide coarse and fine controls of the frequency of the write clock pulse signal. However, it is difficult to achieve accurate automatic phase control of the write clock pulse signal from the VCO by regulation of the control voltage for the latter in response to phase changes in the burst signals due to the summing of the control voltages from the two comparators.

OBJECTS AND SUMMARY OF THE INVENTION

Accordingly, it is an object of this invention to provide an improved clock pulse signal generator for a time base corrector of the type described above, and in which both the frequency and phase of the write clock pulse signal are accurately varied in dependence on time base errors contained in the incoming video or other periodic information signals.

Another object is to provide a write clock pulse signal generator, as aforesaid, in which the automatic frequency control of the write clock pulse signal is disabled and the frequency of the write clock pulse signal is held stable to prevent overcorrection for gross or abrupt time base errors in the incoming video or periodic information signals, for example, as when the incoming signals are recorded video signals being reproduced by a video tape recorder in which a temporary slippage of the tape occurs.

Still another object is to provide a write clock pulse signal generator, as aforesaid, in which automatic phase control of the write clock pulse signal can be realized with a phase comparator and phase shifter operative in respect to relatively small phase differences so as to be constituted by relatively simple circuit arrangements.

In accordance with an aspect of this invention, the write clock signal generator for a digital time base corrector, as aforesaid, comprises an automatic frequency control circuit having a variable frequency oscillator or VCO with its control voltage being determined by comparison of a suitably divided output of the VCO with a first input signal, for example, horizontal synchronizing signal from incoming video signals, and an automatic phase control circuit having a variable phase shifter which receives the output of the VCO and which is controlled by a phase comparator which compares a suitably divided output of the VCO with a second input signal having a frequency higher than that of the first input signal, for example, burst signals separated from the incoming video signals.

In accordance with an important feature of this invention, in response to a gross or abrupt deviation of the frequency of the horizontal synchronizing signals from the divided output of the VCO, for example, when the incoming signal are recorded video signals being reproduced by a video tape recorder in which a slippage of the tape may occur, the phase locked loop or control loop for the VCO is opened and the control voltage for the VCO is held at its previously established value so as to avoid overcorrection of the write clock pulse signal.

In the automatic phase control circuit of a write clock pulse signal generator according to a particularly desirable embodiment of the invention, a binary counter provides a preset pulse during each color synchronizing burst separated from the incoming video signals with the onset of such preset pulse being coincident with a pulse of the relatively high frequency output from the VCO of the automatic frequency control circuit and, therefore, having the same deviation in respect to one of the burst signals, and frequency dividers for providing from the output of the VCO the write clock pulse signal which is to be phase shifted and the signal which is to be phase compared with the burst signals are preset to their initial values by each such preset signal so that the phase comparator and phase shifter of the automatic phase control circuit may be operative only in respect to a relatively small phase deviation which is determined by the ratio of the burst signal frequency to the central frequency of the VCO.

The above, and other objects, features and advantages of the invention, will be apparent in the following detailed description of an illustrative embodiment which is to be read in conjunction with the accompanying drawings.

BRIEF DESCRIPTION OF THE DRAWINGS

FIGS. 7A–7J are waveform diagrams to which reference will be made in explaining the operation of the automatic phase control circuit of FIG. 6.

DESCRIPTION OF THE PREFERRED EMBODIMENTS

Figure 1:
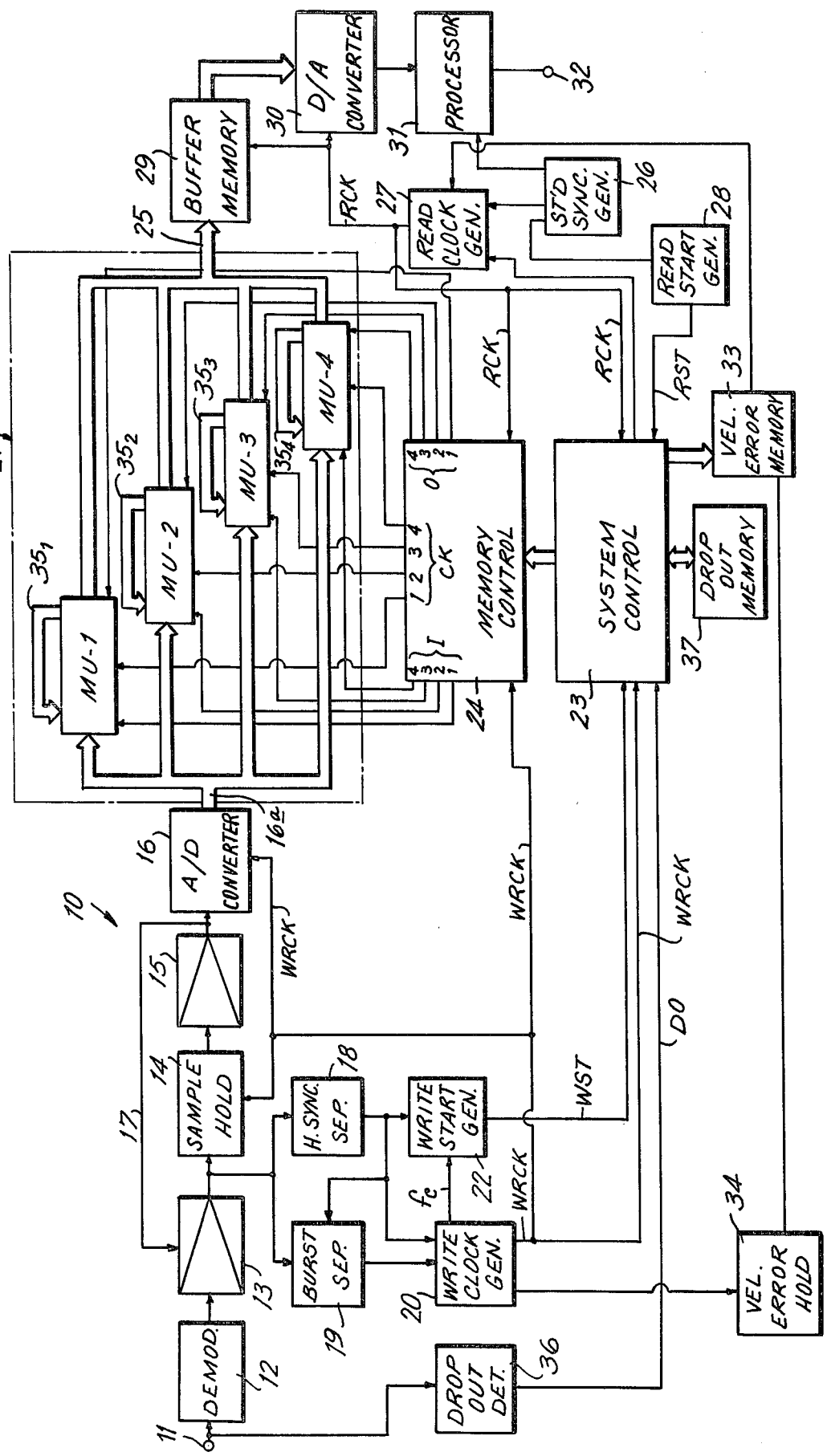
FIG. 1 is a schematic block diagram of a time base corrector in which a write clock pulse signal generator according to this invention may be advantageously employed.

Referring to the drawings in detail, and initially to FIG. 1 thereof, it will be seen that a time base corrector 10 to which this invention may be applied is desirably of the type disclosed in U.S. Patent application Ser. No. 684,488, filed May 10, 1976, and having a common assignee herewith. Such time base corrector is shown to have an input terminal 11 for receiving periodic information signals, such as composite color video signals reproduced by a so-called VTR and having time base errors. If the reproduced composite color video signals applied to terminal 11 are not already in the standard NTSC form, such signals are applied to a demodulator 12 which may include an NTSC encoder. The resulting NTSC color video signals are applied through a buffer amplifier 13 to a sample-hold circuit 14 and from the latter through an amplifier 15 to an analog-to-digital (A/D) converter 16. As shown, a D.C. restoring loop 17 is provided between amplifiers 13 and 15 so that the NTSC color video signals are sampled in D.C. restored form.

The D.C. restored NTSC color video signal issuing from amplifier 13 are further applied to a separator 18 which separates horizontal synchronizing signals therefrom, and to a separator 19 which is gated by the separated horizontal synchronizing signals so as to separate burst signals from the NTSC color video signals. The separated horizontal synchronizing signals and burst signals are applied to a write clock pulse signal generator 20 which, as is hereinafter described in detail, produces write clock pulses WRCK having a relatively high frequency, for example, of about 10.74 MHz which is three times the color or chrominance subcarrier frequency $f_c$ for NTSC signals, and with their frequency or repetition rate and phase being varied in accordance with changes in the frequency and phase, respectively, of the horizontal synchronizing signals and the subcarrier burst signals extracted from the incoming color video signals so as to closely follow or be dependent upon time base errors in such incoming signals.

Further, it will be seen that the write clock pulses WRCK issuing from generator 20 and having a frequency of approximately 10.74 MHz are applied to A/D converter 16 and to sample-hold circuit 14 to control the rate at which the latter samples the demodulated or detected video signals and the rate at which converter 16 converts the sampled signals from their original analog form into digital form. More specifically, in response to each write clock pulse from generator 20, A/D converter 16 is operative to sample the demodulated video signal and convert the latter into a plurality of parallel bit signals, for example, digital information of eight parallel bits.

The parallel bits of digitized signal information are supplied from converter 16 to a memory 21 by way of a digital information bus 16a which, for ease of illustration, is represented by a double line. The memory 21 is shown to include memory units MU-1, MU-2, MU-3 and MU-4, each of which is comprised of a plurality of shift registers equal in number to the number parallel bits making up each word of the digitized video signals. Thus, in the example being described, each of the four memory units MU-1, MU-2, MU-3 and MU-4 is made up of eight shift registers.

Figure 2:
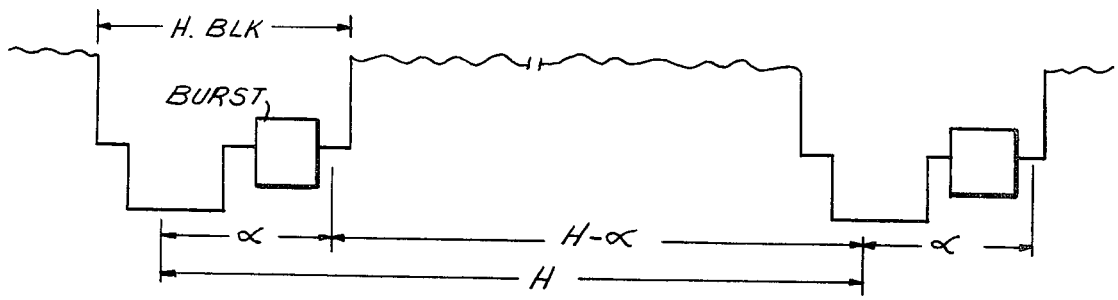
FIG. 2 is a schematic diagram illustrating a color video signal that may be applied to the time base corrector of FIG. 1 for removal of time base errors from such signal.

Each shift register of the memory units MU-1, MU-2, MU-3 and MU-4 is desirably selected to have a storage capacity or memory which, in consideration of the frequency of the write clock pulses from generator 20, is sufficient to store the digitized information corresponding to an even number, that is, 2,4,6,8 . . . etc., of the horizontal or line intervals of the incoming video signals. In the case of NTSC color video signals and a write clock pulse frequency of about 10.74 MHz, there are 682.5 words of digital information for each horizontal or line interval indicated at H on FIG. 2. However, in the illustrated time base corrector, the horizontal synchronizing signals and burst signals occurring during the interval $\alpha$ in each horizontal blanking period are preferably stripped from the incoming video signals prior to the conversion of the latter digital form so that, for example, only 640 words of digital information need to be accommodated in the registers of memory units MU-1, MU-2, MU-3 and MU-4 for each of the even number of horizontal or line intervals to be stored therein. Thus, if the digital information corresponding to two horizontal or line intervals is to be stored in each of the memory units MU-1, MU-2, MU-3 and MU-4, the registers of such memory units have to have capacities for 1280 words corresponding to the sampling in the period 2H-2$\alpha$, as indicated on FIG. 3.

The separated horizontal synchronizing signals are further shown to be applied to a write start generator 22 which also receives a chrominance subcarrier signal $f_c$ from generator 20 and produces a write start pulse WST, for example, at the beginning of every second horizontal or line interval of the incoming video signals in the case where digital information corresponding to two horizontal or line intervals is to be stored in each of the memory units.

The write start pulses WST from generator 22, and the write clock pulses WRCK from generator 20 are applied to a system control circuit 23 which controls the operations of a memory control circuit 24 for effecting the selective writing and reading operations of the memory units MU-1, MU-2, MU-3 and MU-4. More particularly, under normal circumstances, system control circuit 23 causes memory control circuit 24 to produce write control signals $I_1$, $I_2$, $I_3$ and $I_4$ occurring in a repeating cyclic order and which are respectively applied to the memory units MU-1, MU-2, MU-3 and MU-4 in order to determine the sequences in which such memory units are selected or enabled for the writing, in the selected memory unit, of the digitized information corresponding to two, or any other even number of horizontal or line intervals of the incoming video signals. Further, the memory control 24 receives the write clock pulses WRCK from generator 20 and, during the writing period determined by the write control signal $I_1$, $I_2$, $I_3$ or $I_4$, the memory control 24 supplies the write clock pulses WRCK from one of its clock outputs $CK_1$, $CK_2$, $CK_3$ and $CK_4$ to the respective memory unit MU-1, MU-2, MU-3, or MU-4 which is then selected or enabled for writing, so that the digitized information corresponding to two horizontal or line intervals of the video signals is written in the shift registers of the selected memory unit at the clocking rate determined by the frequency of the write clock pulses WRCK which varies in accordance with time base errors in the incoming video signals.

After momentary storage in memory units MU-1, MU-2, Mu-3 and MU-4, the digitized video signal information is read out therefrom in a predetermined sequence to an information or data bus 25. In order to determine the clocking rate at which the digitized information is read out of each of the memory units, the illustrated time base corrector 10 includes a standard sync generator 26 which supplied a carrier signal at a fixed or standard frequency, for example, the standard chrominance subcarrier frequency $f_c$ of 3.58 MHz for NTSC color video signals, to a read clock generator 27 which, in turn produces read clock pulses RCK at a standard frequency, for example, 10.74 MHz, at least at the beginning and end of each reading period. The carrier signal at a fixed or standard frequency is further shown to be applied to a read start generator 28 which produces a read start pulse RST, for example, at intervals corresponding to two horizontal or line intervals for NTSC video signals.

The read start pulses RST from generator 28 are applied to system control circuit 23, and the read clock pulses RCK are applied from generator 27 to system control circuit 23 and memory control circuit 24. Under normal circumstances, system control circuit 23 causes memory control circuit 24 to produce read control signals $0_1$, $0_2$, $0_3$ and $0_4$ occurring in a repeating cycle order and which are respectively applied to memory units MU-1, MU-2, MU-3 and MU-4 in order to determine the sequence in which such memory units are selected or enabled for the reading out therefrom of the digitized information corresponding to two, or any other even number of horizontal or line intervals, which had been previously stored in the selected memory unit. Further, during each reading period determined by the read control signal $0_1$, $0_2$, $0_3$ or $0_4$, the memory control circuit 24 supplies the read clock pulses RCK from a respective one of its clock outputs $CK_1$, $CK_2$, $CK_3$ and $CK_4$ to the selected or enabled memory unit, so that the digitized information corresponding to two horizontal or line intervals of the video signals is read out of the shift registers of the selected memory unit at the standard clocking rate of the read clock pulses RCK.

The read clock pulses RCK are also applied to a buffer memory 29, which receives the digitized information sequentially read out of memory 21, and to a digital-to-analog (D/A) converter 30 which is operative to convert the buffered digital output of memory 29 back to the original analog form. The analog output of D/A converter 30 is applied to a processor 31 which receives the standard frequency carrier signal from generator 26, and which is operative to add to the output of converter 30 the color burst and composite synchronizing signals which were previously stripped from the incoming video signals. The resulting composite color video signals are then obtained at an output terminal 32 of processor 31.

In order to correct for velocity errors that may appear in the incoming video signals, the time base corrector 10 to which this invention is applied may further detect the velocity error at the write clock generator 20 during each writing period and then supply the detected velocity error to a velocity error memory 33 by way of a velocity error hold circuit 34. The velocity error memory 33, under the control of system control circuit 23, memorizes the velocity error detected during the writing period of each of the memory units MU-1, MU-2, MU-3 and MU-4, and, during the reading period of each of the memory units, applies a corresponding velocity error correcting signal to read clock generator 27 by which the read clock pulses RCK from the latter are suitably modulated to eliminate or compensate for the velocity errors. Thus, the read clock pulses RCK, while having the standard frequency at the beginning and end of each reading period, may vary during such reading period.

In any event, it will be apparent that, in the time base corrector 10, as described above, successive line intervals of the incoming video signals are written in memory 21 at a clocking rate which varies generally in accordance with the time base errors of the incoming signals, and that the video signals are read out from memory 21 at a standard clocking rate so that the video signals obtained at output terminal 32 have any time base errors removed therefrom.

Further, in the time base corrector 10 to which this invention is applied, the memory units MU-1, MU-2, MU-3 and MU-4 may be provided with recycle loops $35_1$, $35_2$, $35_3$ and $35_4$, respectively, so that upon the occurrence of the read control signal $0_1$, $0_2$, $0_3$ or $0_4$ for causing reading out of the digital information stored in a memory unit, the information being read out from the selected memory unit is simultaneously applied through the respective recycle loop to the input of the selected memory unit so as to be rewritten in the latter. The foregoing arrangement is shown to be provided in association with a dropout detector 36 which is connected with input terminal 11 for detecting any dropout in the incoming video signals and providing a corresponding dropout signal DO to the system control circuit 23, and with a dropout memory 37 in which information concerning the occurrence of dropout in the incoming video signals is stored for influencing the writing and reading sequences of the memory units so as to eliminate such dropout from the time base corrected video signals obtained at output terminal 32.

Figure 3:
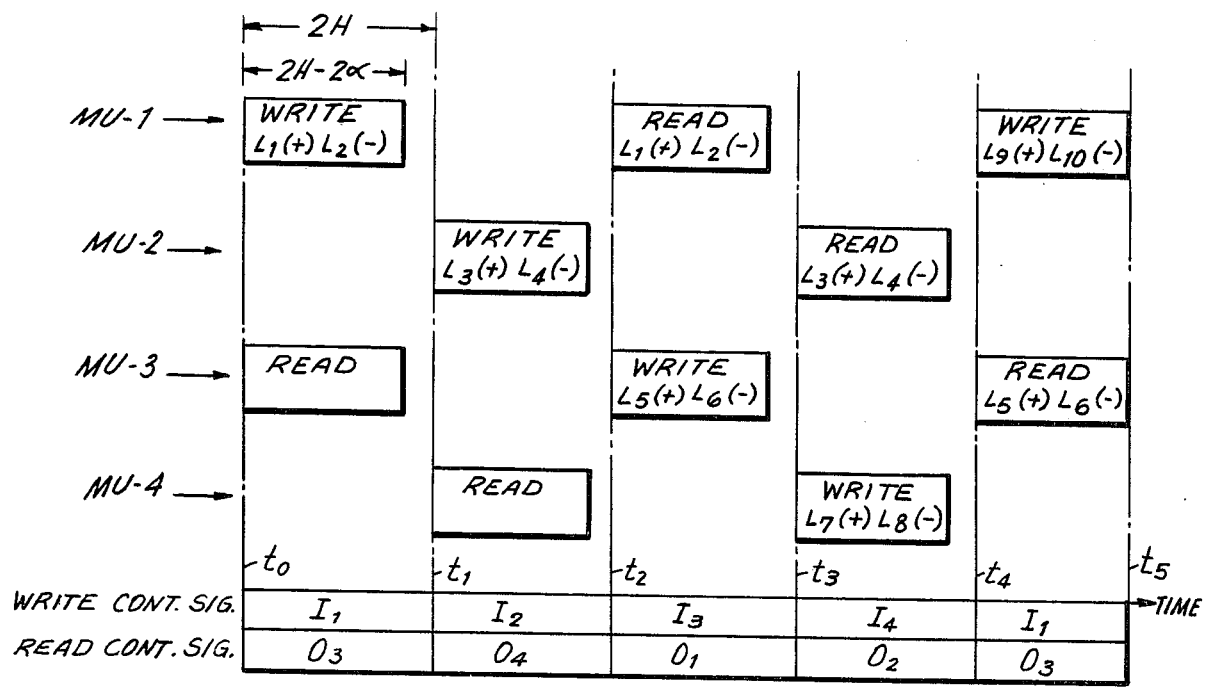
FIG. 3 is a timing chart showing the cyclic orders in which signal information may normally be written in, and read out of the several memory units of the time base corrector of FIG. 1.

As is shown on FIG. 3, in the illustrated time base corrector 10, the cyclically occurring write control signals $I_1$, $I_2$, $I_3$ and $I_4$ for sequentially writing digital information corresponding to two, or any other even number of horizontal or line intervals, in each of the memory units MU-1, MU-2, MU-3 and MU-4 may normally occur simultaneously with the cyclically occurring read control signals $0_3$, $0_4$, $0_1$ and $0_2$, respectively, for sequentially reading out the digital information previously stored in the respective memory units MU-3, MU-4, MU-1 and MU-2, respectively. Thus, in the successive time periods $t_0-t_1$, $t_1-t_2$, $t_2-t_3$, $t_3-t_4$, $t_4-t_5$, . . . etc., digital information corresponding to line intervals $L_1$ and $L_2$, $L_3$ and $L_4$, $L_5$ and $L_6$, $L_7$ and $L_8$, $L_9$ and $L_{10}$, . . . etc. are written sequentially in memory units MU-1, MU-2, MU-3, MU-4 MU-1, . . . etc. Correspondingly, the digital informations representing line intervals $L_1$ and $L_2$, $L_3$ and $L_4$, $L_5$ and $L_6$, . . . etc. are read out of the respective memory units MU-1, MU-2, MU-3 . . . etc., during the time intervals $t_2-t_3$, $t_3-t_4$, $t_4-t_5$, . . . etc.

Figure 4:
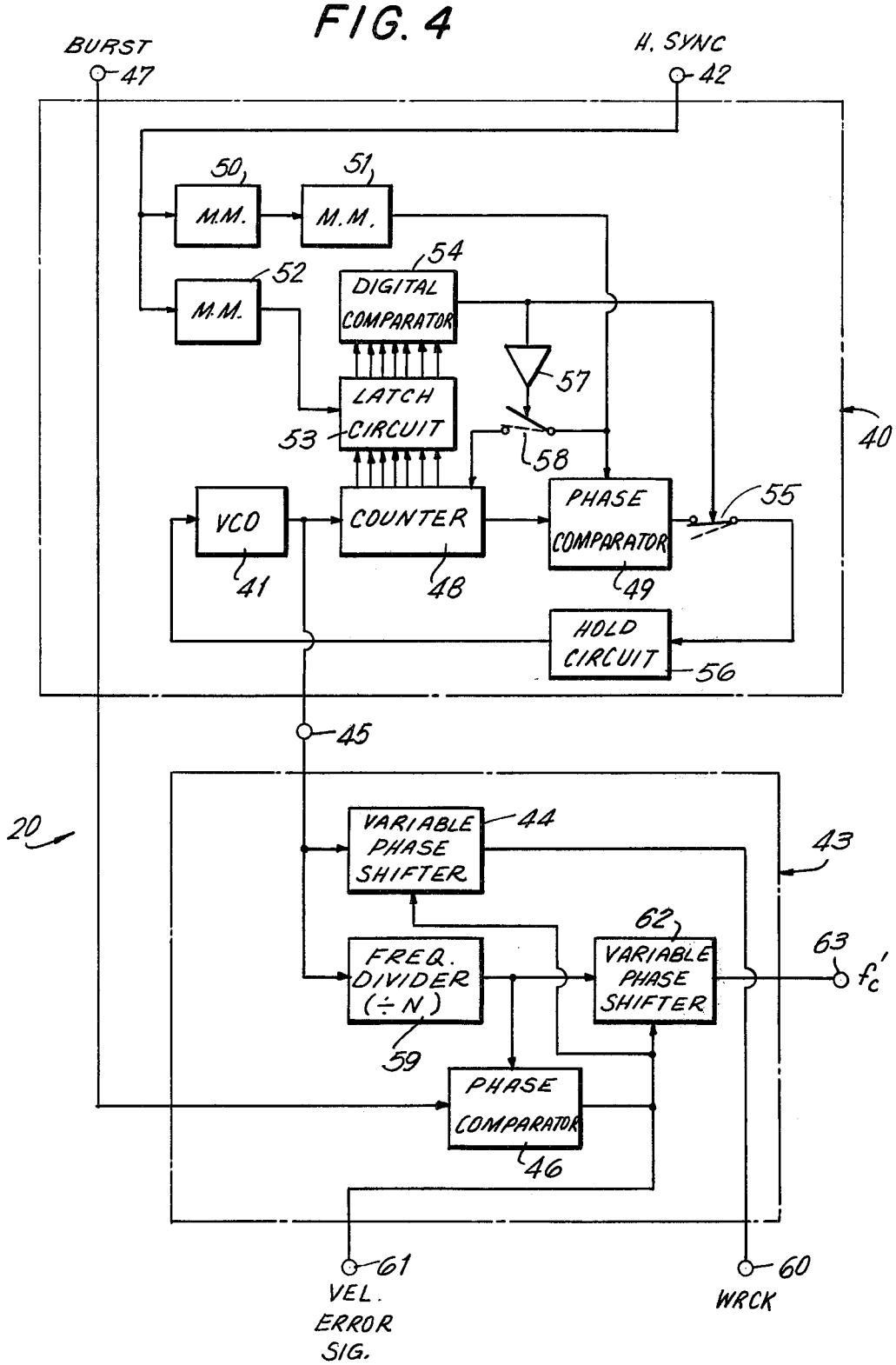
FIG. 4 is a schematic block diagram of a write clock pulse signal generator according to an embodiment of this invention.

Referring now to FIG. 4, it will be seen that, in accordance with the present invention, the write clock pulse signal generator 20 for a time base corrector, for example, of the type described above, generally comprises an automatic frequency control circuit 40 having a variable frequency oscillator or VCO 41 with its control voltage being determined by comparison of a suitably divided output of VCO 41 with the horizontal synchronizing signals received at a terminal 42 from separator 18, and an automatic phase control circuit 43 having a variable phase shifter 44 which receives the output of VCO 41 at a terminal 45 and which is controlled by a phase comparator 46 comparing a suitably divided output of VCO 41 with the burst signals received at a terminal 47 from separator 19.

More particularly, it will be seen that, in the embodiment of the invention illustrated on FIG. 4, the output of VCO 41 has a center frequency which is N times the chrominance subcarrier frequency of the color video signals being processed, for example, 3 × 3.58 MHz or 10.74 MHz in the case of NTSC color video signals, and such output from VCO 41 is supplied to a counter 48 which operates as a frequency divider dividing by (455/2)×N Thus, counter 48 provides a divided output at the horizontal or line frequency of 15.75 KHz, and such divided output is applied to one of the inputs of a phase comparator 49. The horizontal synchronizing signal received at terminal 42 triggers a monostable multivibrator 50 acting as a delay, and the falling side of the output pulse from monostable multivibrator 50 triggers a monostable multivibrator 51 to provide an output pulse from the latter which is in predetermined timed relation to the horizontal synchronizing signal and is applied to another input of phase comparator 49 for comparison in the latter with the divided output of VCO 41 obtained from counter 48. The horizontal synchronizing signal received at terminal 42 further triggers a monostable multivibrator 52 to provide an output pulse which, at its falling side, actuates a latch circuit 53 for latching the contents of counter 48 at such time. A digital comparator 54 receives the latched contents of counter 48 from latch circuit 53 and detects the difference between the phase of the incoming horizontal synchronizing signal or pulse and the pulse of the divided output from counter 48 as indicated by the latched contents of such counter. The digital comparator 54 provides an output signal of a relatively high level "1" when the phase difference detected by comparator 54 lies within predetermined limits, such as, for example, ±0.5 microseconds, whereas, the output signal from comparator 54 has a low level "0" when the detected phase difference exceeds the predetermined limits. Such output signal from digital comparator 54 is employed to actuate a switch or gate 55 which, so long as the output signal from comparator 54 has its relatively high value "1", conducts the output of phase comparator 49 to a hold circuit 56 which, in turn, has its output connected to VCO 41 as the control voltage for the latter. The output signal from digital comparator 54 is further applied through an inverter 57 for actuating a switch or gate 58 through which the output signal of monostable multivibrator 51 is selectively applied to counter 48 for resetting the latter at the falling side of the output signal or pulse from monostable multivibrator 51. The switch 58 is in its open condition, as shown in full lines on FIG. 4, so long as the output signal from digital comparator 54 is at its high level "1" for closing switch 55, whereas, when the output signal from comparator 54 is at its low level "0", switch 58 is closed simultaneously with the opening of switch 55.

It will be apparent that, in the automatic frequency control circuit 40 as described above, phase comparator 49 will normally compare the phases of the incoming horizontal synchronizing signals and of the divided output of VCO 41 as obtained from counter or frequency divider 48 and, on the basis of such comparison, provide a control signal which is supplied through closed switch 55 to hold circuit 56. The resulting output of hold circuit 56 is applied, as a control voltage, to VCO 41 so as to adjust the output frequency of the latter to a value which is held until the next horizontal synchronizing signal is received at terminal 42. Thus, so long as the phase differences detected by comparator 54 are within the predetermined limits, the output frequency of VCO 41 will be varied in accordance with changes in the frequency of the incoming horizontal synchronizing signals, that is, in accordance with time base errors in the incoming color video signals. However, when there is a gross or abrupt time base error in the incoming color video signals to produce a corresponding abrupt or gross deviation in the timing of the horizontal synchronizing signals received at terminal 42, for example, when the incoming signals are recorded video signals being reproduced by a video tape recorder in which a jumping or slippage of the tape may occur, the resulting excessive phase difference between a received horizontal synchronizing signal and the output of counter or frequency divider 48 causes comparator 54 to provide its output signal with the low level "0" so that switch 55 is opened and switch 58 is closed. The opening of switch 55 opens or interrupts the so-called phase locked loop for VCO 41 constituted by counter 48, phase comparator 49 and hold circuit 56 so that hold circuit 56 continues to apply the previously established control voltage to VCO 41 for maintaining the output frequency of the latter at its previously established value for another horizontal or line interval. The closing of switch 58 simultaneously with the opening of switch 55 causes the output signal or pulse from monostable multivibrator 51 to be effective, at its falling side, to reset counter 48. It will be noted that the delay provided by the monostable multivibrator 50 ensures that such resetting of counter 48 will be effected only after a time interval sufficient to allow actuation of the switches 55 and 58. From the foregoing, it will be apparent that the described automatic frequency control circuit 40 of the write clock pulse signal generator 20 according to this invention is effective to avoid overcorrection of the output from VCO 41 in response to the described gross or abrupt changes in the timing of the incoming horizontal synchronizing signals.

In the automatic phase control circuit 43 of the embodiment of this invention illustrated on FIG. 4, the output of VCO 41 applied through terminal 45 to the input of variable phase shifter 44 is also applied to a frequency divider 59 for division in the latter by N, that is, the numeral 3 in the example being described, with the result that the divided output of frequency divider 59 has the same frequency as the burst signals applied from terminal 47 to an input of phase comparator 46. Another input of phase comparator 46 receives the divided output of frequency divider 59 so that comparator 46 compares the phases of the divided output of VCO 41 and of the received burst signals and, on the basis of such comparison, provides a suitable control signal for variable phase shifter 44 which causes the latter to provide, at an output terminal 60, the write clock pulse signal WRCK which has its phase shifted in dependence on the burst signals separated from the incoming video signals. The error or control signal from phase comparator 46 may be further applied to an output terminal 61 to constitute the velocity error signal which, in the time base corrector of FIG. 1 is applied to the velocity error hold circuit 34. Further, in the automatic phase control circuit 43 of FIG. 4, the divided output of frequency divider 59 is applied to a second variable phase shifter 62 which is also controlled by the error or control signal from phase comparator 46 so as to provide, at an output terminal 63, a chrominance subcarrier signal $f_c$ which is in phase with the burst signals separated from the incoming video signals and which, in the time base corrector of FIG. 1, is applied to the write start generator 22.

It will be apparent that, in the write clock pulse signal generator 20 according to this invention, as described above with reference to FIG. 4, the write clock pulse signal WRCK obtained at output terminal 60 has its frequency varied in accordance with relatively coarse time base errors in the incoming video signals, as typified by the horizontal synchronizing signals separated therefrom, while the fine control of the write clock pulse signal is effected by phase changes therein in accordance with the burst signals separated from the incoming color video signal.

Figure 5:
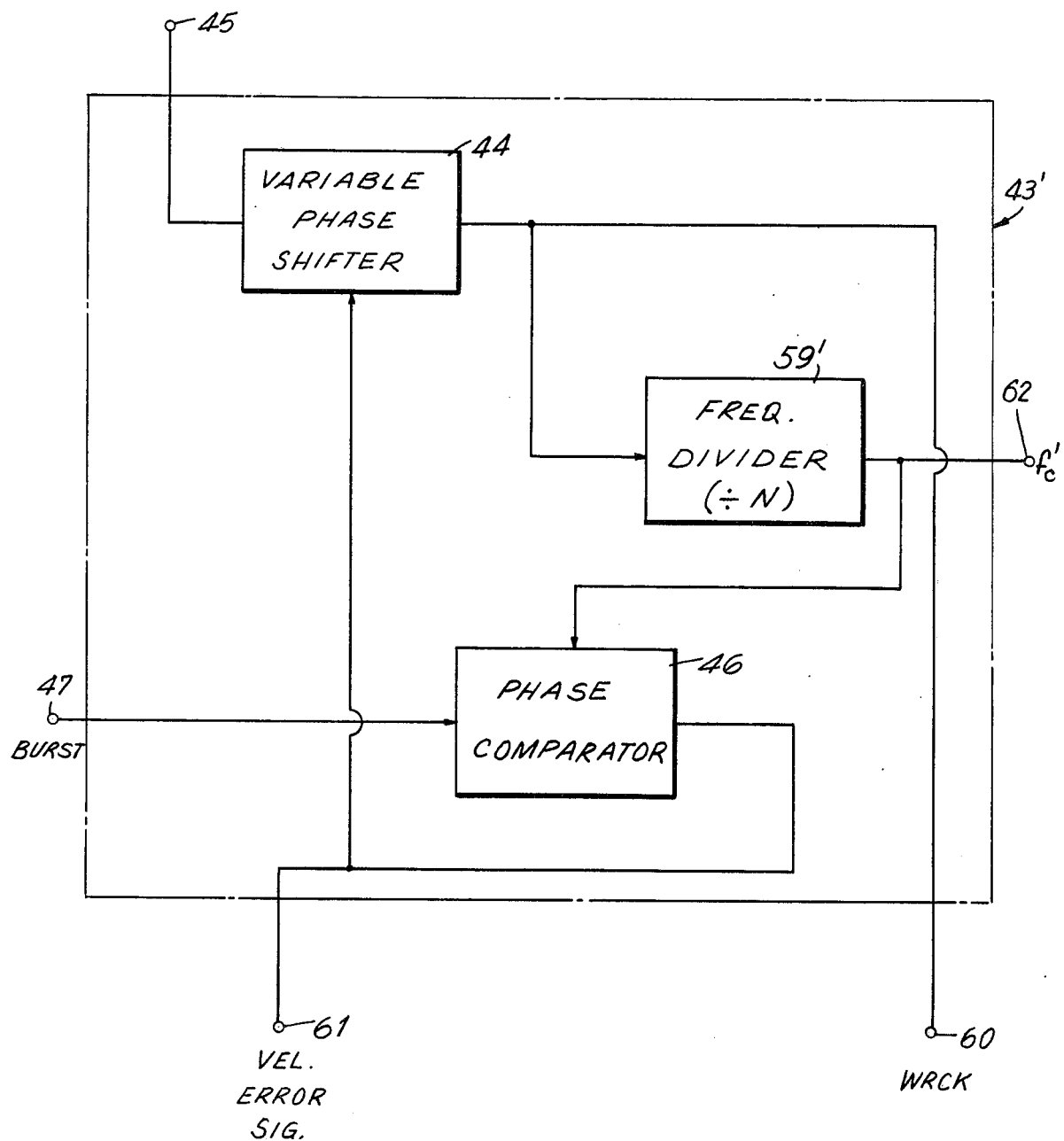
FIG. 5 is a schematic block diagram showing a modification of the automatic phase control circuit included in the write clock pulse signal generator of FIG. 4.

Referring now to FIG. 5, it will be seen that, in an automatic phase control circuit 43' which is generally similar to the previously described circuit 43 and may be similarly associated with the automatic frequency control circuit 40 of FIG. 4, the various components of circuit 43' are identified by the same reference numerals as were applied to the corresponding components on FIG. 4. However, in the circuit 43', as shown on FIG. 5, only a single variable phase shifter 44 is required, that is, the variable phase shifter 62 of the circuit 43 is omitted, and the frequency divider 59' receives the output of variable phase shifter 44. Thus, the frequency divided output of divider 59' provides the phase shifted or controlled chrominance carrier signal $f_c$ at terminal 62 and is compared, in phase comparator 46 with the burst signals from terminal 47 to provide the error or control signal for variable phase shifter 44 and the velocity error signal at terminal 61.

It will be apparent that, in the automatic phase control circuits 43 and 43' described above with reference to FIGS. 4 and 5, each of the phase comparators 46 has to be capable of detecting phase differences over a range of 0° to 360°, and that each variable phase shifter 44 and 62 has to be similarly capable of shifting the phase of the signal passed therethrough in a range of 0° to 360°. Generally, phase comparators and shifters which are capable of operating over such a broad range have complex circuit arrangements and, thus, are relatively costly.

Figure 6:
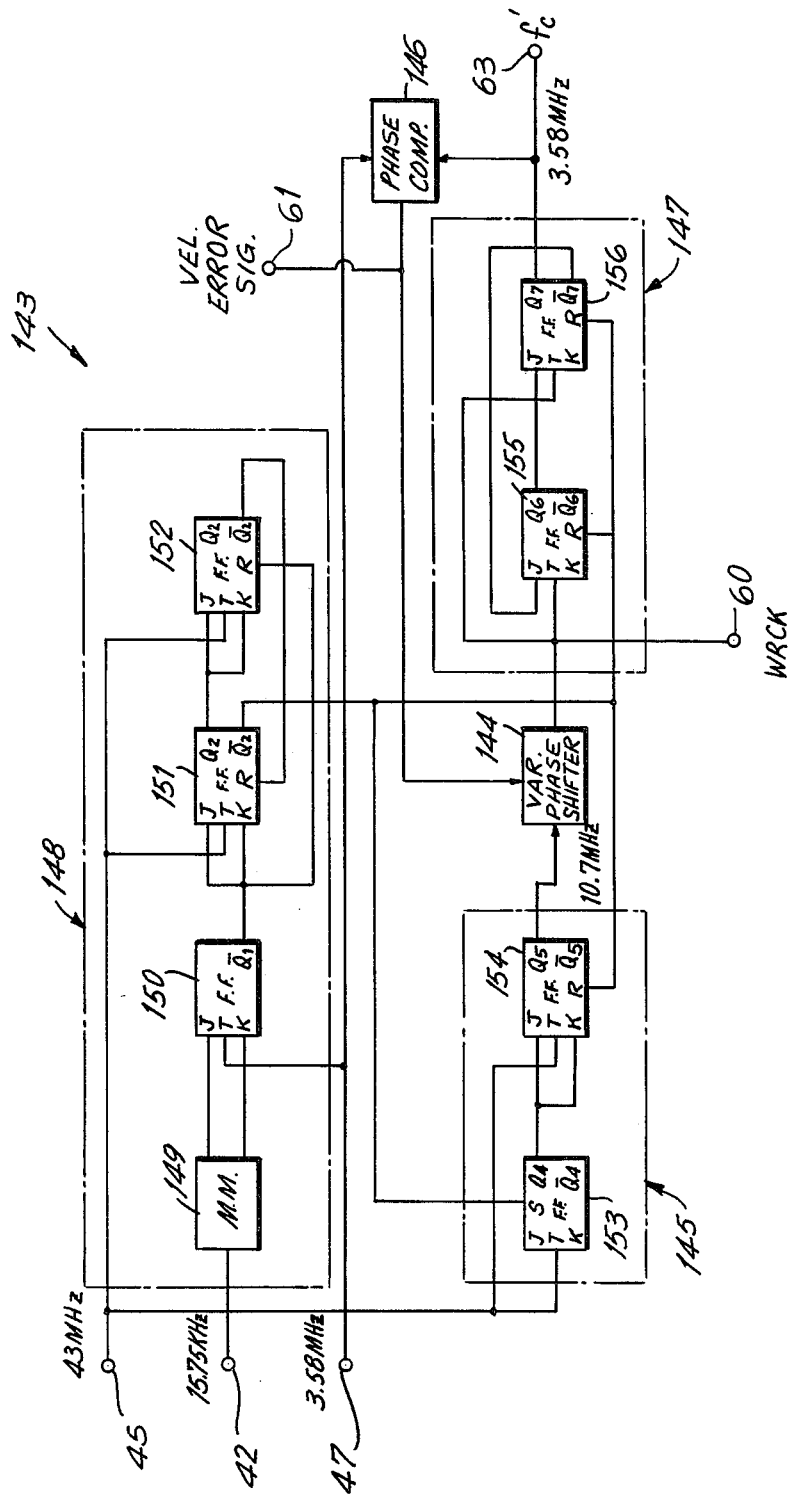
FIG. 6 is a schematic block diagram showing an automatic phase control circuit that may be advantageously included in a write clock pulse signal generator according to another embodiment of this invention.

The above problems can be avoided with an automatic phase control circuit 143 according to another embodiment of the invention which is shown on FIG. 6, and which is also intended to operate in association with an automatic frequency control circuit similar to the circuit 40 of FIG. 4. Thus, in the circuit 143, terminals 42 and 47 respectively receive the horizontal synchronizing signals and burst signals separated from incoming color video signals, and terminal 45 receives the output of VCO 41 of the automatic frequency control circuit. However, in the embodiment of FIG. 6, the output of the VCO applied to terminal 45 is assumed to have a center frequency of 43 MHz, that is, 12 × $f_c$, so that, in the automatic frequency control circuit to be associated with circuit 143 of FIG. 6, the counter 48 acting as a frequency divider will have to divide the output of VCO 41 by (455/2)×12 to provide the output of counter 48 with the desired horizontal or line frequency of 15.75 KHz for phase comparison in comparator 49 with the horizontal synchronizing signals.

As shown, the automatic phase control circuit 143 generally comprises a variable phase shifter 144 which operates on the VCO output received at terminal 45 after the same has been frequency divided in a frequency divider 145, and which is controlled by a phase comparator 146 comparing the burst signals received at terminal 47 with the output of variable phase shifter 144 following the further frequency dividing of such output in a frequency divider 147, and a circuit 148 by which the range of the phase comparing and phase shifting operations is limited.

More particularly, the circuit 148 is shown to include a monostable multivibrator 149 which is triggered by the falling or down-going edge $a'$ of each horizontal synchronizing signal received at terminal 42 (FIG. 7A) to produce an output signal (FIG. 7C) having a duration selected so that the termination at $a$ of such output signal from monostable multivibrator 149 occurs within the duration T of the respective color synchronizing burst (FIG. 7B) applied to terminal 47. The non-inverted output signal (FIG.7C) of monostable multivibrator 149 and a corresponding inverted output signal are respectively applied to the J and K inputs of a J-K flip-flop 150 which has its T-input connected to terminal 47 for receiving the burst signals therefrom. Thus, flip-flop 150 is set by the down-going or falling edge of the first burst signal occurring during the presence of the non-inverted output signal from monostable multivibrator 149 and is reset by the down-going edge of the first burst signal which occurs after the termination of the output signal from monostable multivibrator 149, with the result that flip-flop 150 provides the output signal shown on FIG. 7D at its inverted output terminal $\overline{Q}_1$. The $\overline{Q}_1$ output signal from flip-flop 150 is applied to the J and K inputs of a J-K flip-flop 151 and also to the reset terminal R of a J-K flip-flop 152. The VCO output (FIG. 7E) received at the terminal 45 is applied to the T-inputs of flip-flops 151 and 152, while the non-inverted output $Q_2$ of flip-flop 151 is applied to the J and K inputs of flip-flop 152 and the inverted output $\overline{Q}_3$ of flip-flop 152 is fed back to the reset terminal R of flip-flop 151. By reason of the foregoing connections, the flip-flops 151 and 152 cooperate with each other to act as a binary counter and to produce a pulse signal (FIG. 7F) at the $Q_2$ non-inverted output of flip-flop 151. As is shown, such non-inverted output or pulse signal $Q_2$ has its onset at the first VCO pulse occurring after the resetting of the flip-flop 150, and the $Q_2$ pulse signal terminates at the down-going edge of the $\overline{Q}_3$ output, that is, at the next occurring pulse from the VCO. Therefore, the pulse signal $Q_2$ has a pulse width corresponding to the period between successive pulses of the VCO output. Furthermore, the phase difference $d$ between the pulse signal $Q_2$, and hence the corresponding inverted output signal $\overline{Q}_2$ from flip-flop 151, and the burst signal corresponds to the phase difference between the VCO pulse and the burst signal. It should be noted that such phase difference $d$ is smaller than one period of the VCO output applied to terminal 45 because the flip-flop 151 is triggered by such VCO output.

In the case where the frequency $f_b$ of the burst signals is 3.58 MHz, as for NTSC color video signals, and the central frequency $f_{cp}$ of the VCO output is 43 MHz, as indicated above, the frequency $f_b$ is 1/12 of the frequency $f_{cp}$. Thus, in the example being described, the phase difference $d$ lies within the range of 0° to 360°/12 = 30°, in which one cycle of the burst signals is assumed to be 360°.

Continuing with the automatic phase control circuit 143 as shown on FIG. 6, it will be seen that the frequency divider 145 is in the form of a quadri-counter which includes two stages of J-K flip-flops 153 and 154. The VCO output received at terminal 45 is applied to the T-inputs of the flip-flops 153 and 154, and the inverted output or pulse signal $\overline{Q}_2$ from flip-flop 151 is applied to the set and reset terminals of the flip-flops 153 and 154, respectively. Accordingly, the non-inverted output signal $Q_4$ as shown at FIG. 7G is obtained from flip-flop 153 and is supplied to the J and K inputs of flip-flop 154 so that the non-inverted output signal $Q_5$ (FIG. 7H), as obtained from flip-flop 154, will have a frequency of 10.7 MHz, that is, ¼ the frequency of the VCO output. Such output signal $Q_5$ obtained from flip-flop 154 is supplied to the variable phase shifter 144 which is controlled by a control signal from the phase comparator 146, and which has its phase-shifted output applied to the output terminal 60 for constituting the desired write clock pulse signal.

The frequency divider 147 is shown to include J-K flip-flops 155 and 156 which cooperates to form a triple counter. More particularly, it will be seen that the phase-shifted output of variable phase shifter 144 is applied to the T-inputs of flip-flops 155 and 156 which both receive the inverted output pulse signal $\overline{Q}_2$ from flip-flop 151 at their reset terminals. Further, the non-inverted output signal $Q_6$ (FIG. 7I) of flip-flop 155 is applied to the J-input of flip-flop 156, while the inverted output signal $\overline{Q}_7$ from flip-flop 156 is fed back to the J-input of flip-flop 155. Thus, the non-inverted output signal $Q_7$ (FIG. 7J) obtained from flip-flop 156 has the frequency 3.58 MHz and is applied to an input terminal of phase comparator 146 for comparison in the latter, with the burst signals received at terminal 47. Accordingly, phase comparator 146 provides a control voltage for the variable phase shifter 144 on the basis of the phase comparison of output signal $Q_7$ from flip-flop 156 with the burst signals.

It will be apparent that, in the automatic phase control circuit 143 according to this invention, as in the previously described embodiments thereof, the phase of the write clock pulse signal WRCK is varied in accordance with the phase of the burst signals separated from the incoming color video signals independently of the variation of the frequency of the write clock pulse signal in accordance with the horizontal synchronizing signals separated from the incoming video signals. Therefore, the variation of phase in accordance with the burst signals can be accurately effected to ensure that the phase as well as the frequency of the write clock pulse signal will closely correspond to time base errors in the incoming video signals.

It is further to be noted that, since the inverted output phase signal $\overline{Q}_2$ from flip-flop 151 is applied to the reset terminals of flip-flops 155 and 156 as well as to the set terminal of flip-flop 153 and the reset terminal of the flip-flop 154, the output signals $Q_4$, $Q_5$, $Q_6$ and $Q_7$ from the flip-flops 153, 154, 155 and 156, respectively, are preset to their initial conditions [1,0,0,0] at the time $c$, that is, at the onset of the pulse signals $Q_2$ and $\overline{Q}_2$. As a result of the foregoing, the phase variation range of the output signal $Q_7$ having the frequency 3.58 MHz, and which is compared with the burst signals, is 0° to 30°. In other words, if the phase difference $d$ exceeds 30°, the $Q_7$ output signal will be preset. Thus, the variable phase shifter 144 and the phase comparator 146 need only operate in respect to phase shifts or differences of, at most, 30°, and, accordingly, the phase shifter and phase comparator of circuit 143 can be provided with relatively simple and inexpensive circuit arrangements.

As in the previously described embodiments of the invention, in the automatic phase control circuit 143 of FIG. 6, the control signal from phase comparator 146 may be also applied to an output terminal 61 to constitute the velocity error signal, while the output signal $Q_7$ from flip-flop 156 is also led to an output terminal 63 to constitute the phase and frequency-corrected chrominance signal $f'_c$.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a time base corrector for periodic information signals containing first and second reference signals having relatively low and high frequencies, respectively varying with time base errors in such periodic information signals, and in which the following periodic information signals are converted to digital form and written in a memory at a clocking rate determined by a write clock pulse signal modulated in accordance with time base errors in the incoming signals, whereupon the digitized signals temporarily stored in the memory are read out therefrom substantially at a standard clocking rate and the resulting digitized output from the memory is reconverted to analog form for eliminating the time base errors: a generator for said write clock pulse signal comprising an automatic frequency control circuit including a variable frequency oscillator having an output with a center frequency which is a multiple of said high frequency of the second reference signal, and phase locked loop means receiving said oscillator output and said first reference signal for varying the frequency of said oscillator output in accordance with variations in the frequency of said first reference signal; and an automatic phase control circuit including variable phase shifting means, means for applying said oscillator output to said variable phase shifting means so as to obtain said write clock pulse signal at the output of said variable phase shifting means, and control means for said variable phase shifting means operative to vary the phase of said write clock pulse signal in dependence on a phase comparison of said second reference signal and said oscillator output.

2. A time base corrector according to claim 1; in which said automatic frequency control circuit further includes means operative, in response to an abrupt change in the frequency of said first reference signal, to hold the frequency of said oscillator output at a previously established value.

3. A time base corrector according to claim 1; in which said phase locked loop means includes counter means receiving said oscillator output and acting as a frequency divider therefor, phase comparator means receiving the frequency divided output of said counter means and said first reference signal to provide a control voltage dependent on the phase difference therebetween, and hold circuit means receiving said control voltage and applying the same to said variable frequency oscillator for controlling the frequency of the output therefrom.

4. A time base corrector according to claim 3; in which said automatic frequency control circuit further includes latch circuit means actuated in response to said first reference signal for latching the contents of said contour means, digital comparator means responsive to the latched contents of said counter means for detecting the extent of the phase difference between said first reference signal and said frequency divided output of the counter means, and means for resetting said counter means and for isolating said control voltage between said phase comparator means and said hold circuit means when the phase difference detected by said digital comparator means exceeds a predetermined value.

5. A time base corrector according to claim 1; in which said incoming periodic information signals are color video signals, and said first and second reference signals are respectively horizontal synchronizing signals and burst signals separated from said color video signals.

6. A time base corrector according to claim 1; in which said control means for the variable phase shifting means includes frequency dividing means receiving the oscillator output, and phase comparator means comparing the phases of the divided output from said frequency dividing means and of said second reference signal to provide a control voltage dependent on the phase difference therebetween; and in which said control voltage controls the phase shift effected by said variable phase shifting means.

7. A time base corrector according to claim 6; in which said frequency dividing means receives said oscillator output in advance of the passage of the latter through said variable phase shifting means.

8. A time base corrector according to claim 6; in which said frequency dividing means receives said oscillator output after the passage of the latter through said variable phase shifting means.

9. A time base corrector according to claim 6; in which said incoming periodic information signals are color video signals from which horizontal synchronizing signals and chrominance synchronizing bursts are separated to constitute said first and second reference signals, respectively; said automatic phase control circuit further includes means responsive to said oscillator output, said horizontal synchronizing signals and said chrominance synchronizing bursts to produce, for each horizontal interval, a pulse signal which has a phase difference from one of the respective burst signals equal to the phase difference between said one burst signal and a pulse of said oscillator output; and said frequency dividing means includes counting means which is preset in response to each said pulse signal so that said phase shifting means and said phase comparator means need only be effective for phase shifts and differences, respectively, which are a fraction of one cycle of said chrominance synchronizing bursts.

10. A time base corrector according to claim 9; in which said center frequency of the oscillator output is twelve times the frequency of said chrominance synchronizing bursts so that the maximum phase difference of each said pulse signal from a respective one of said burst signals is 1/12 of said one cycle of the chrominance synchronizing bursts.

11. A time base corrector according to claim 10; in which said counting means includes a quadri-counter receiving said oscillator output to apply to said variable phase shifting means a divided oscillator output with a center frequency that is three times the frequency of said chrominance synchronizing bursts, and a triple-counter receiving the phase-shifted output of said variable phase shifting means and provide therefrom a further divided output having a center frequency equal to said frequency of the chrominance synchronizing bursts and which is compared with the latter in said phase comparator means; and in which each of said quadri- and triple-counters is preset by each said pulse signal.

* * * * *